Jan. 11, 1944.  A. E. SUMMERS  2,338,826
DEVICE FOR TESTING AND ADJUSTING SPRINGS
Filed Dec. 30, 1941  2 Sheets-Sheet 1
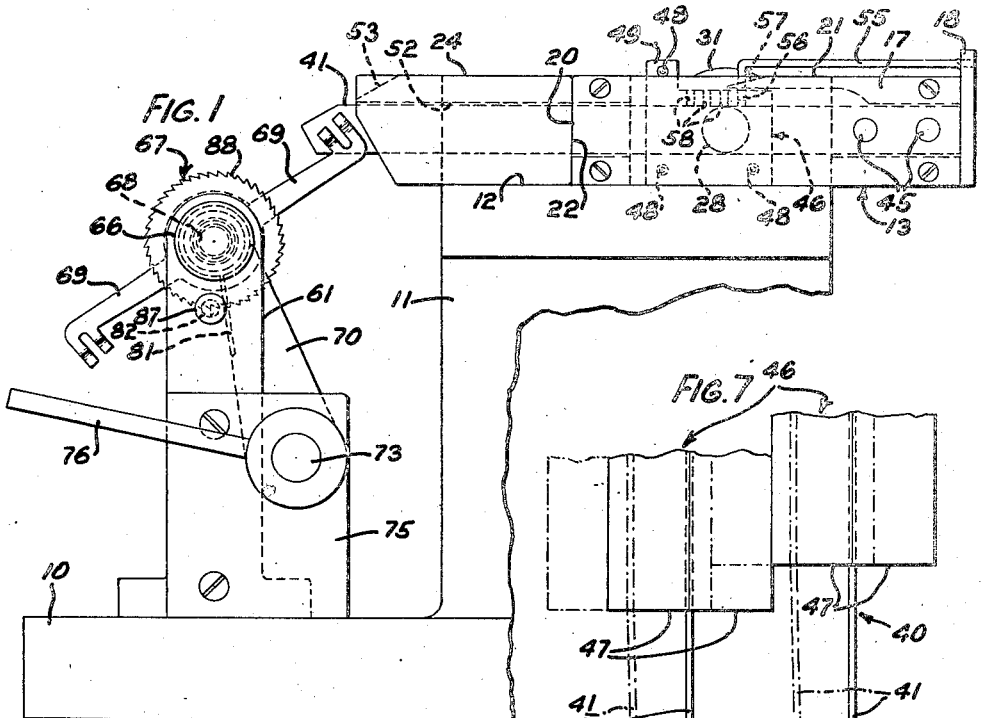
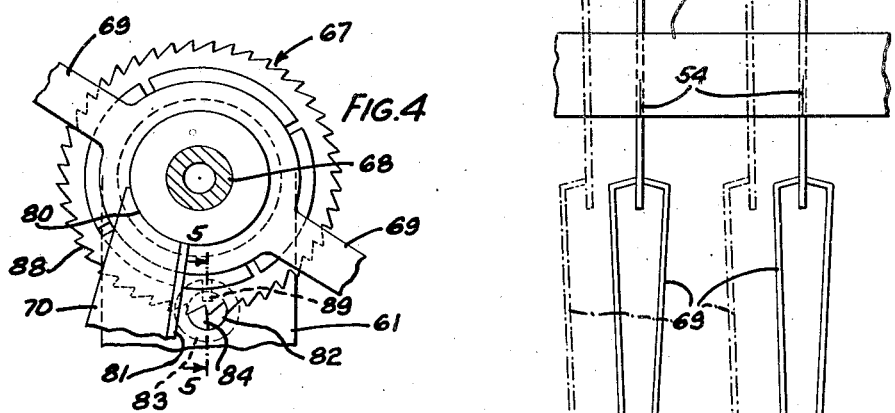
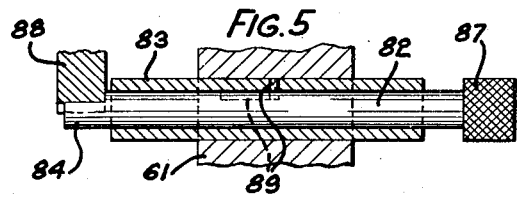
INVENTORS
A. E. SUMMERS
BY Harry L. Duft
ATTORNEY

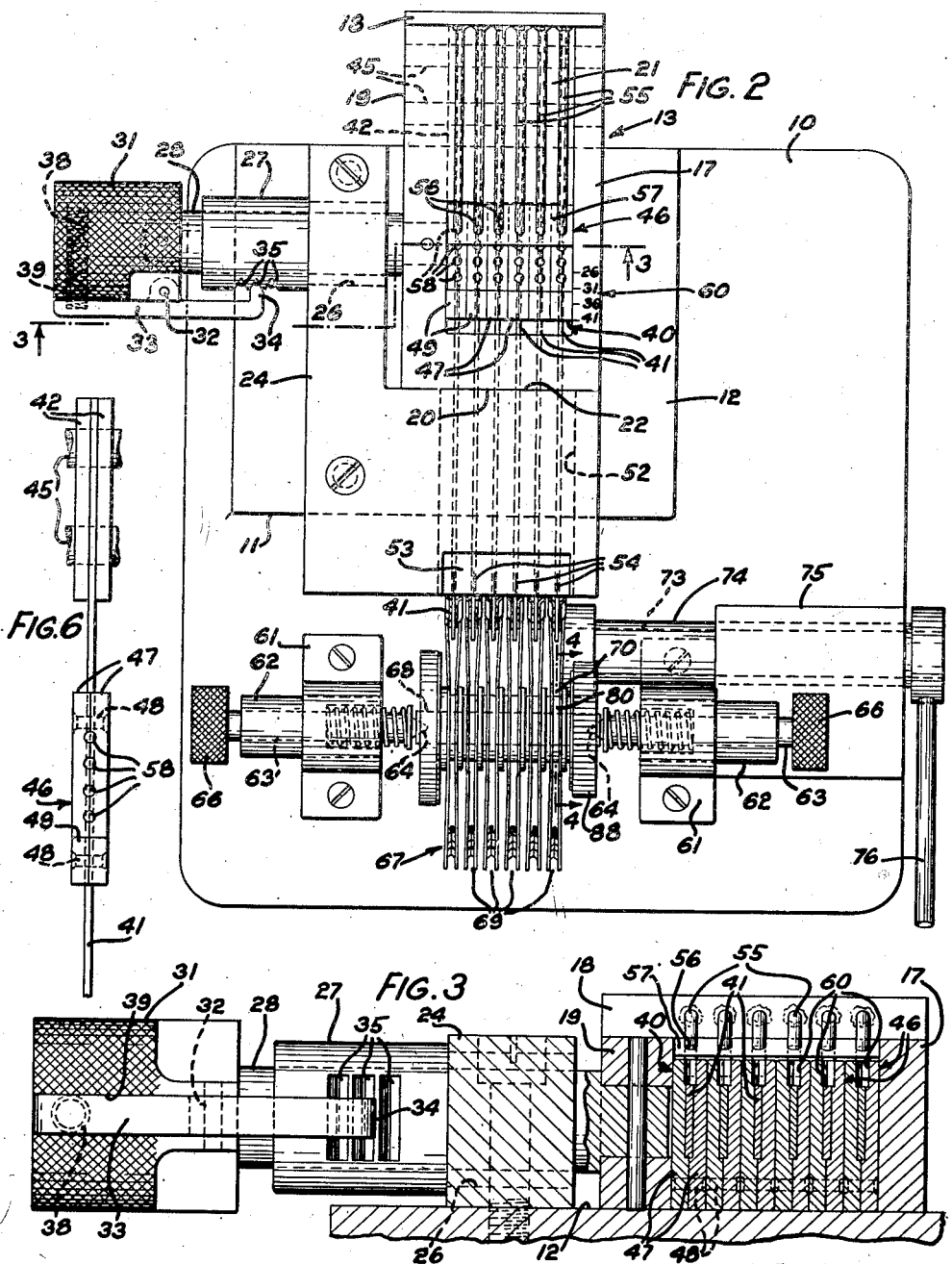

Patented Jan. 11, 1944

2,338,826

UNITED STATES PATENT OFFICE 2,338,826

DEVICE FOR TESTING AND ADJUSTING SPRINGS

Albert E. Summers, Riverside, Ill., assignor to Western Electric Company, Incorporated, New York, N. Y., a corporation of New York Application December 30, 1941, Serial No. 424,847

3 Claims. (Cl. 73—51)

This invention relates to devices for testing and adjusting springs and more particularly to such devices combining means for pregauging positions and tensioning of contact springs of a multiple contact spring assemblage relative to predetermined locations and tensions thereof when subsequently mounted for use.

In telephone exchange apparatus of the panel dial machine switching type, there are employed rotor brush multiple contact spring assemblages which include a plurality of compactly arranged sets or pairs of opposed double ended brush springs, each of which is associated with a definite row of fixed bank terminals. In an assemblage of this type, due to its particular construction and arrangement of elements, it is desirable, previous to its being mounted on the switching apparatus, that the opposed springs of each pair be of the same tension when disposed at a predetermined location, for instance, 90° to the rotary axis of the assemblage so that the springs of each pair will accurately contact its row of bank terminals with the same contact pressure when mounted upon the apparatus. Furthermore, in spring assemblages of this type, similar and/or predetermined different tensions for the individual pairs of springs are required.

An object of this invention is to provide an efficient and practical device for accurately pregauging the positions and tensioning contact springs.

In accordance with the foregoing object, this invention provides, in one embodiment thereof, a device for freely rotatably supporting and locking a contact spring assemblage of the above described type in predetermined lateral and longitudinal positions with respect to a set of stationary reference marks, the marks being so spaced that they correspond in position to definite rows of bank terminals. Mounted in a laterally slidable carrier in alignment with the reference marks when the carrier is in a neutral position are a plurality of reed type gauges which may be engaged by either end of the opposed springs of each pair when the assemblage is rocked about its axis of rotation. Means are provided for locking the carrier either in its neutral position or when slid to either side thereof to operative positions such a distance as to provide for a predetermined range of tensions. The resiliency of each reed gauge is adjustable in order to cause each pair of springs to be biased with the desired tension so that the different pairs of springs may be tested for and adjusted to different tensions.

Other objects and advantages of this invention will more fully appear from the following detailed description, taken in conjunction with the accompanying drawings, in which Fig. 1 is a fragmentary side view of a multiple contact spring assemblage testing device embodying the features of this invention showing a spring assemblage mounted thereon for testing;

Fig. 2 is a plan view of Fig. 1 showing the reed gauges in their neutral position;

Fig. 3 is an enlarged fragmentary vertical section taken on the line 3—3 of Fig. 2;

Fig. 4 is an enlarged fragmentary vertical section taken on the line 4—4 of Fig. 2;

Fig. 5 is an enlarged fragmentary vertical section taken on the line 5—5 of Fig. 4;

Fig. 6 is an enlarged fragmentary plan view of Fig. 2 showing one of the reed gauges and associated elements removed from the carrier, and Fig. 7 is a diagrammatic fragmentary view on an enlarged scale of the testing device illustrating the method of testing and adjusting sets of springs having different tensions, the spring assemblage being shown fragmentarily.

Referring to the drawings in detail and particularly to Figs. 1 and 2, 10 indicates a base or support provided at its left side (Fig. 2) with a vertical standard 11 terminating at its upper end in a shelf 12 upon which is mounted a laterally slidable multiple gauge carrier, indicated in general at 13. The carrier 13 comprises an irregularly shaped hollow frame or box-like member having removable side and end walls 17 and 18 and integral side and end walls 19 and 20, respectively, and a partial upper wall 21. The bottom surfaces of the carrier frame walls 17, 19 and 20 are slidable upon the shelf 12 while vertical surfaces of the walls 17 and 20 are slidable upon a vertical surface 22 of a stationary L-shaped member 24 (Fig. 2) which is secured to the shelf 12.

Secured by a drive fit in a horizontal aperture 26 in the member 24 is a shouldered sleeve 27, in which is freely longitudinally slidable a shaft 28. Opposite ends of the shaft 28 are reduced and one end extends into and is pinned to the wall 19 of the gauge carrier frame and its opposite end is pinned to an irregular generally cylindrically shaped head 31. Pivoted at 32 to the head 31 is a latch lever 33, having at one end an angularly extending arm with a V-shaped end 34 arranged to engage in any one of three V-shaped notches 35 formed in the periphery of the stationary sleeve 27. The lever 33, at its opposite end, is constantly urged counter-clockwise about its pivot 32 by a compression spring 38 having opposite ends entered in suitable apertures in the head 31 and the lever. The head 31 is slotted, as indicated at 39 (Figs. 2 and 3), to receive the lever 33 when it is rocked clockwise to withdraw the V-shaped end 34 thereof from the V-shaped notch 35 when it is desired to slide the gauge carrier 13 to one or the other of its three latchable positions. As shown in Fig. 2, the carrier 13 is latched in its neutral position and in the testing of springs is latched first to one side thereof and finally at the opposite side.

Snugly mounted in the gauge carrier 13, between the opposed inner surfaces of the side walls 17 and 19, are a plurality of reed type gauge units which, in the present embodiment of the device, consist of six units indicated, in general, at 40. Since each gauge unit is similar in construction, the following description applies to each one. Referring to Fig. 6, wherein one of the gauge units is shown on an enlarged scale and removed from the carrier 13, 41 is a reed-like steel spring. Arranged at each side of the reed spring 41, at its upper end (Figs. 2 and 6), are spacer plates 42 and the six gauge units are secured in position in the carrier 13 by a pair of pins 45 having a driving fit in apertures formed in the opposite side walls 17 and 19 of the carrier. Surrounding and freely slidable longitudinally on the reed spring 41 is a spring tension adjusting block 46. The adjusting block 46 comprises two abutting grooved plates 47 (Fig. 3), the opposed grooves of the plates forming an opening for receiving the spring 41. The bottom surface of the block 46 abuts the upper surface of the shelf 12 and slides thereon when moved longitudinally of the spring 41, as well as when the carrier 13 is moved laterally on the shelf in the manner previously described. The plates 47 are riveted together, as indicated at 48, and are formed with vertical extensions at their left ends (Fig. 1) to provide a handle 49 to facilitate the adjustment of the block 46 along the spring 41 when varying the tension of the spring. It is to be understood that the combined width of the six gauge units with their adjusting blocks 46 and the spacer plates 42 is such that they snugly fit between the opposed side walls 17 and 19, the arrangement being such that the blocks 46 are individually freely slidable upon the reed springs 41. The springs 41 extend unsupported and forward of the blocks 46 for a suitable distance and thus are free to flex to the left or right, as viewed in Fig. 2. A slot 52 is formed in the stationary member 24 through which the forward end of the springs extend to freely permit their flexing movements. A sloping face 53, upon the forward end of the member 24, is provided with six calibration marks 54, one for each of the reed springs 41, which, in the neutral position of the gauge carrier 13, as shown particularly in Fig. 2, are in accurate alignment with the marks 54. In this position of the carrier 13, the reed springs 41 are not under tension.

To the end wall 18 of the carrier frame are attached six U-shaped spring rods 55, which are aligned with the reed springs 41 and their adjusting blocks 46, the rods extending to the left, as shown in Fig. 1, or forward in Fig. 2. The short arms on the free ends of the rods 55 extend downwardly and are freely entered in apertures 56 in a sloping face 57 of the upper wall 21 of the carrier frame, thus preventing lateral movement of the rods. Four vertical apertures 58 are formed in the upper surface of each of the tension adjusting blocks 46 (Figs. 1 and 6) for the entrance of the short arms of the rods 55, thus providing four different positions to which each of the blocks may be moved and retained to provide different tensions for each of the reed springs 41.

To facilitate the setting of the tension adjusting blocks 46, the gauge carrier 13 is provided, upon its upper surface (Fig. 2), with a set of gram or other measurement graduations 60 with which the forward end surface of the blocks are aligned for the desired tension. As shown in Fig. 2, the six blocks 46 are aligned with a graduation indicating forty-one grams; therefore, all six reed springs 41 are adjusted to similar tension, namely, forty-one grams. In the diagrammatic showing in Fig. 7, the two tension adjusting blocks 46 are longitudinally positioned at different points along the reed springs 41 and thus the free lengths of the springs extending from the blocks are different and, consequently, the resiliency of the reed springs will vary.

Upon the forward end of the base 10 are secured a pair of spaced aligned standards 61 supporting fixed sleeves 62, in each of which is mounted a spring pressed plunger 63 (Fig. 2). The inner ends of the plungers 63 are cone-shaped, as indicated at 64, and their outer ends are enlarged and knurled to provide hand grips 66. The hand grips 66 are spaced from the outer ends of the sleeves 62 when a brush spring assemblage to be tested and adjusted is supported between the plungers 63 such distances that when the assemblage is removed, the plungers will move a limited distance toward each other, the distance between the plungers then being such that an assemblage may be readily mounted therebetween by moving outwardly one or the other of the plungers.

As shown in the drawings, the plungers 63 rotatably support a rotor brush multiple contact spring assemblage, indicated in general at 67, for testing, and such assemblage includes a hollow shaft 68 into the ends of which the plunger ends 64 extend. In mounting the spring assemblage 67 in position on the device for testing, one or the other of the plungers 63 is pulled outwardly by means of its hand grip 66 to permit the spring assemblage shaft 68 to be entered between and aligned with the cone-shaped ends 64 of the plungers and upon release of the plunger the spring assemblage is freely rotatably supported upon its longitudinal axis in substantially the correct lateral position for testing with its six sets of opposed double ended brush springs 69 predeterminedly longitudinally positioned relative to the free outer ends of the six reed springs 41, as clearly shown in Fig. 1.

To acurately test the brush springs for position and tension, so that they will accurately register with the contacts of the apparatus upon which they will be used and also that the contact pressure of the springs of each pair be similar, it is necessary that the six sets of brush springs 69, which are spaced apart on centers identical to the spacing of the six reed springs 41, be located accurately relative to the reed springs. In other words, it is necessary that each pair of brush springs should initially be so positioned that it will be centered with its reed spring when the spring assemblage 67 is rocked clockwise on the plungers 63 to the position shown in Fig. 1 so that each reed spring will enter between its aligned pair of brush springs and slightly deflect each brush spring a similar amount, as shown diagrammatically in Fig. 6.

To effect this lateral location and the retention of the brush spring assemblage 67 during gauging operations relative to the reed springs 41, there is provided a pivotal locating blade 70, which is attached to one end of a shaft 73 rotatably carried in a sleeve 74 predeterminedly fixed longitudinally in a standard 75 secured to the right hand plunger standard 61 (Fig. 2). To the opposite end of the shaft 73 is attached a hand lever 76 for rocking the shaft and thereby the locating blade 70 into and out of operative position with the brush spring assemblage 67. In the drawings, the blade 70 is shown in operative position between the right hand pair of brush springs 69, as viewed in Fig. 2. The blade 70 is of a thickness identical with the space between the two springs and is arc-shaped at its outer or free end to snugly fit against the periphery of a spacer element 80 arranged between the springs (Fig. 4). For the purpose of guiding the blade 70 into operative position, its leading longitudinal edge is formed with a knife-edge 81. Thus, in case the assemblage 67 is not accurately laterally located relative to the reed springs 41, the movement of the blade to its operative position will shift the assemblage slightly one way or the other along with the spring plungers 63.

It is desirable that the brush spring assemblage 67 be locked from angular displacement after being rocked clockwise to the position shown in Fig. 1, wherein it is ready for the spring tension testing and adjusting operations. This is efected, referring particularly to Figs. 4 and 5, by means of a pin 82 reciprocably carried in a sleeve 83 fixed in the right hand standard 61 (Fig. 2). The pin 82 is provided at one end with a tooth 84 and at its opposite end with a hand grip 87. In the operative locking position of the pin 82, the tooth 84 is engaged between teeth of a ratchet wheel 88 of the assemblage. The pin 82 is limited in its reciprocable movement and prevented from rotation in the sleeve 83 by a cooperating pin and slot, indicated at 89, the pin being fixed to the sleeve and entered in a slot in the pin.

The device, as before stated, is particularly designed for use in pregauging and adjusting opposite brush spring ends of a rotor brush multiple contact spring assemblage 67 of the hereinbefore described type so that opposed springs of each pair at opposite ends will be of identical desired tension when disposed 90° to the rotary axis of the assemblage, whereby each set of springs, when the assemblage is operatively associated with its row of bank terminals on the switching apparatus, will engage its terminals with the same contact pressure and such desired tensions may be similar throughout the assemblage or may vary.

The spring assemblage 67 is first rotatably mounted on the spring pressed plungers 63 and predeterminedly laterally located and locked in position to center each set of brush springs 69 with its reed spring by rocking the locating blade 70 into its operative position (Figs. 1 and 4) in the manner previously described. Thereafter, the assemblage 67 is rotated clockwise (Fig. 1) to enter the six reed springs 41 between the opposed springs of the six sets of brush springs 69 (Figs. 1, 2 and 7) and is locked in such angular position by sliding the toothed pin 82 into operative engagement between teeth of the ratchet wheel 88 of the assemblage. The sets of brush springs 69 are now in position to be tested and adjusted to the desired tension, assuming that the individual reed springs 41 have been adjusted to the desired resiliency by positioning the adjustable blocks 46 in the manner previously described.

The right or left hand spring of each pair of brush springs 69 is tested and adjusted in succession and then the opposite springs of each pair. For example, referring particularly to Figs. 2 and 7, the left hand spring of each pair of brush springs 69 will first be deflected towards the left by a lateral movement of the carriage 13 in the same direction by means of the similarly moving reed springs 41 on the carriage engaging the brush springs. This is shown in broken outline in Fig. 7. The carriage 13 is laterally moved towards the left by grasping the head 31 and pressing the latch lever 33 clockwise about its pivot 32 (Fig. 2) to withdraw the lever end 33 from the neutral notch 35 and drawing the head 31 and the attached reed spring carriage 13 to the left until the lever end 33 can engage in the left hand notch 35. Thus, each left hand spring 69 is deflected away from the opposed right hand spring, which is then free of the reed spring, although it will follow somewhat the movement of the reed spring. The opposed right hand spring 69 of the left hand pair of springs is then engaged by a hand tool (not shown) and moved toward the right past the associated calibration mark 54. The opposed spring 69, deflected by the reed spring 41, is then engaged at a point adjacent the axis of the assemblage by a hand adjusting tool (not shown) and flexed laterally one way or the other to increase or decrease the tension until the engaging predeterminedly tensioned reed spring 41, upon release of the brush spring, will be aligned with the mark 54. The corresponding brush spring 69 of each pair is gauged and adjusted in a similar manner until the six reed springs 41 are similarly aligned with their respective calibration marks 54.

Thereafter, the reed gauge carrier 13 is shifted laterally to the other side of its neutral position and the right hand brush spring of each pair is similarly gauged and adjusted. The opposite ends of the brush springs 69 are now gauged and adjusted in a similar manner after withdrawing the toothed pin 82 from the teeth of the ratchet wheel 88 and rotating the assemblage 180° to enter the reed springs 41 between the brush spring ends.

From the foregoing description, it will be apparent that an efficient and practical device is provided for accurately pregauging and adjusting opposite spring ends of a rotor brush multiple contact spring assemblage comprising a plurality of sets of contact springs for position relative to predetermined locations and the tensions thereof when the assemblage is operatively associated with its row of terminals on the switching apparatus.

It will be understood that the embodiment herein described is merely illustrative of the invention and one application thereof.

What is claimed is:

1. An apparatus for gauging rotor brush spring assemblages, having angular spaced sets of opposed brush springs arranged about a rotatable axis, comprising a base, gauging means on said base, means on said base for rotatably mounting said assemblage on its axis, said latter means including yieldable elements whereby the sets of springs may be brought into predetermined lateral position centered with said gauging means and in predetermined angular relation to said axis, and pivotal means on said base for engagement with opposed springs of one set to laterally shift and center the sets of springs with said gauging means.

2. In a device for gauging the tension of opposite ends of a set of cooperating rotary brush springs, a base, a laterally movable member thereon, a reed-like element on said member normally aligned at its free end with a fixed reference mark, means on said base for yieldably laterally supporting a set of springs to be gauged with their ends engaged with the free end of said element, means predeterminedly positioned on said base and movable into position between the set of springs at a point removed from said ends thereof for centering the same with said element, and means for laterally moving said member to first deflect in one direction and then the other direction said reed-like element and one of the spring ends laterally of said reference mark.

3. In a device for gauging the tension of opposite spring ends of a rotary brush spring assemblage, a base, a laterally movable member thereon, a reed-like element on said member normally aligned at its free end with a fixed reference mark, yieldably mounted means on said base for predeterminedly rotatably supporting and laterally positioning a spring assemblage with its spring to be gauged at opposite ends, one end thereof at a time, engaged with the free end of said element, means on said base movable into engagement with cooperating means on the spring assemblage for retaining the latter in an angular position with its spring engaging said element, and means for laterally moving said member to cause the free end of said element and the engaged spring end to be deflected laterally of said reference mark.

ALBERT E. SUMMERS.